April 1, 1958 P. R. GRAHAM ET AL 2,828,684
COFFEE OXIDATION PREVENTATIVE APPARATUS
Filed Jan. 18, 1954 3 Sheets-Sheet 2
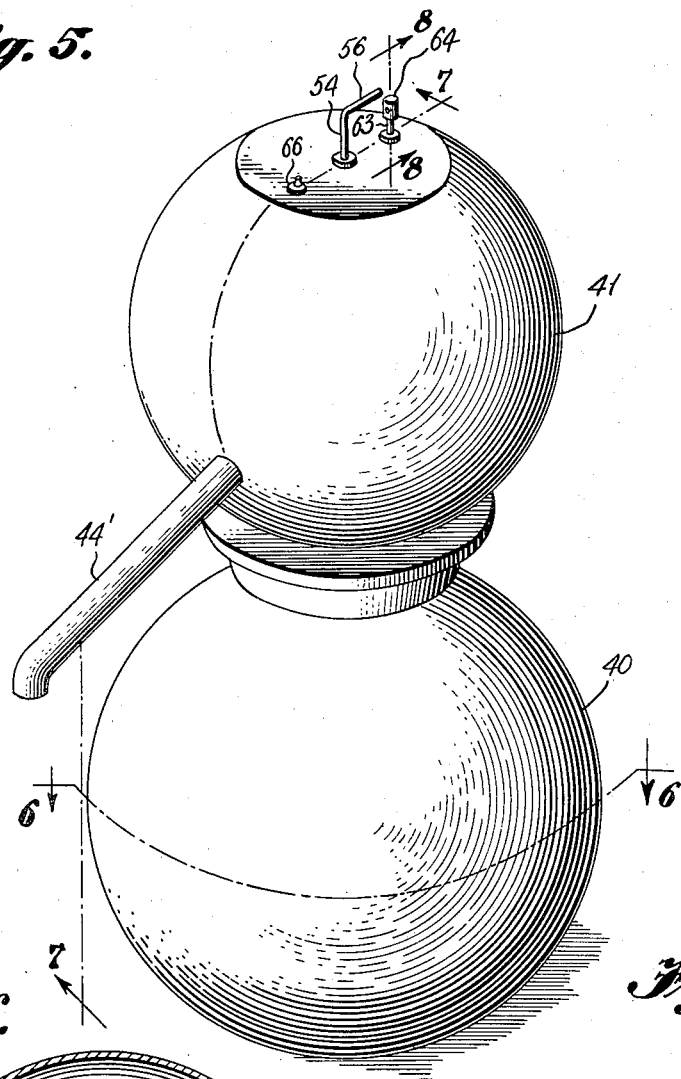
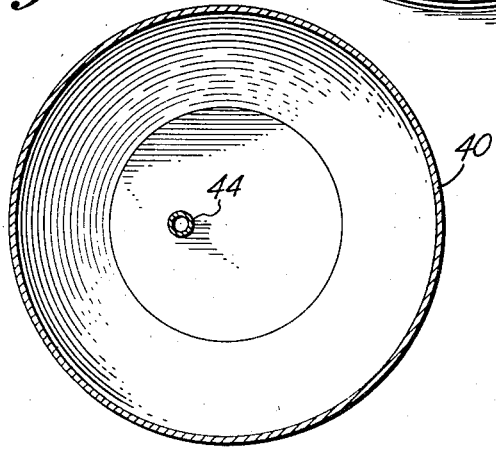
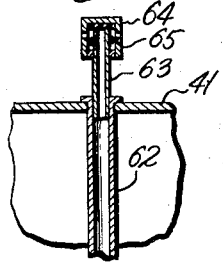
INVENTORS
Phil R. Graham and
Louis E. Perine
BY Mason, Fenwick & Lawrence
ATTORNEYS April 1, 1958 P. R. GRAHAM ET AL 2,828,684
COFFEE OXIDATION PREVENTATIVE APPARATUS
Filed Jan. 18, 1954 3 Sheets-Sheet 3

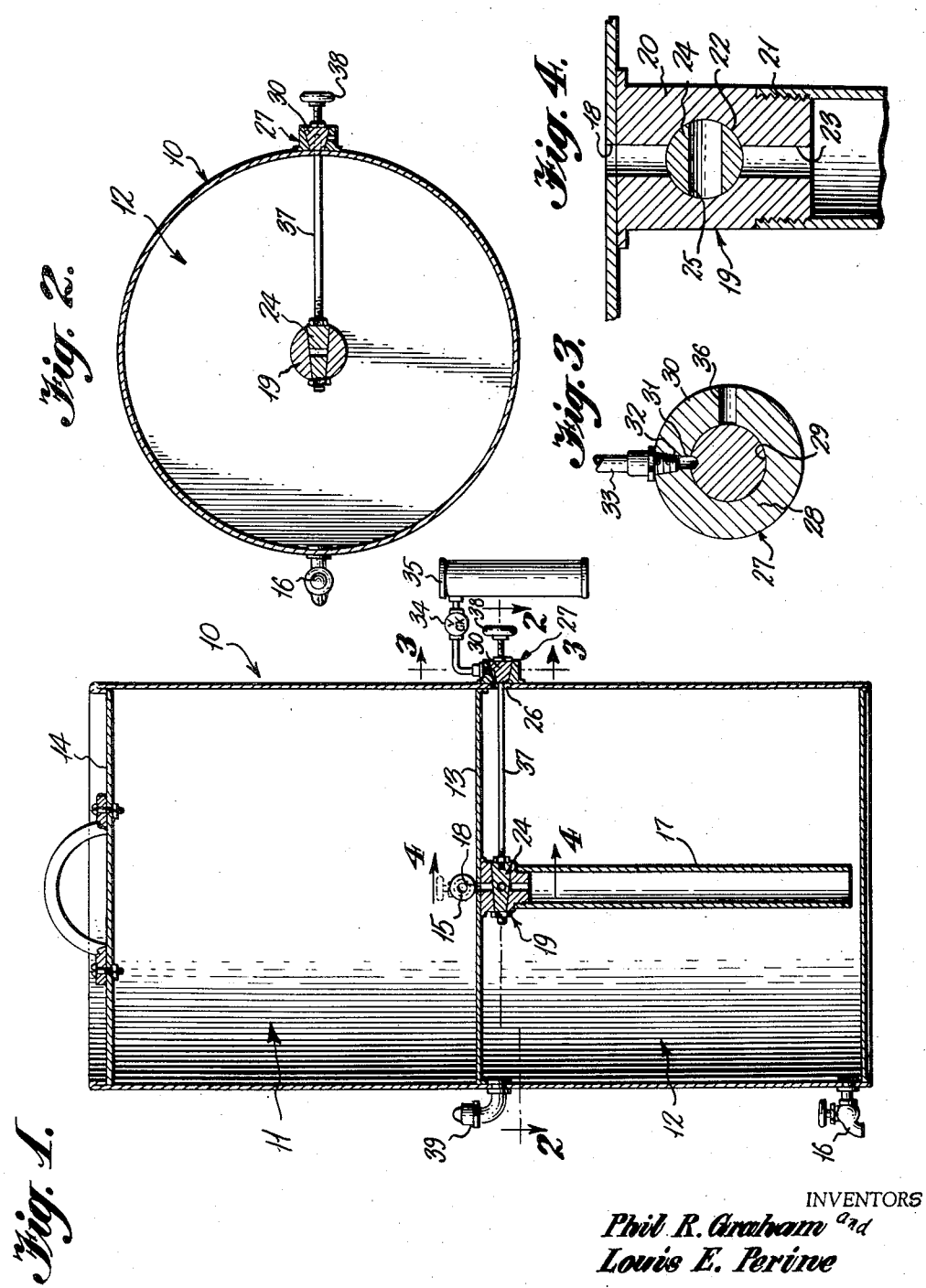

INVENTORS
Phil R. Graham and
Louis E. Perine
BY
Mason, Fenwick & Lawrence
ATTORNEYS United States Patent Office 2,828,684
Patented Apr. 1, 1958

2,828,684

COFFEE OXIDATION PREVENTATIVE APPARATUS

Phil R. Graham, Bristol, and Louis E. Perine, Uffington, W. Va.

Application January 18, 1954, Serial No. 404,508

2 Claims. (Cl. 99—290)

The present invention relates in general to coffee brewing apparatus, and more particularly to improved coffee brewing apparatus having provision for preventing oxidation or aging of brewed coffee.

Heretofore, a primary objection to conventional coffee brewing apparatus, particularly of the type used in commercial establishments such as restaurants where large quantities of coffee are brewed, has been the difficulty encountered in preserving the flavor of the brewed coffee for several hours without aging. The loss of satisfactory flavor in brewed coffee has been traced primarily to oxidation of the coffee arising from contact of the coffee with air.

An object of the present invention therefore is the provision of coffee brewing apparatus wherein brewed coffee may be preserved for long periods without loss of desired flavor.

Another object of the present invention is the provision of novel coffee brewing apparatus having means for isolating brewed coffee from contact with air for long periods to prevent aging of the brewed coffee.

Another object of the present invention is the provision of coffee brewing apparatus wherein an inert gas may be maintained under pressure over the surface of the brewed coffee until and during withdrawal of servings to preserve the coffee against aging.

Other objects, advantages and capabilities of the present invention will become apparent from the following detailed description, taken in conjunction with the accompanying drawings, showing two preferred embodiments of the invention.

In the drawings:

Figure 1 is a vertical transverse section view of coffee brewing apparatus embodying the present invention, having application particularly to commercial coffee brewing apparatus.

Figure 2 is a horizontal transverse section view taken along the lines 2—2 of Figure 1.

Figure 3 is a vertical transverse section of the air relief and inert gas admission valve, taken along the lines 3—3 of Figure 1.

Figure 4 is a vertical section view of the valve controlling admission of coffee to the storage chamber, taken along the lines 4—4 of Figure 1.

Figure 5 is a perspective view of a modified form of coffee brewing apparatus and accessory means therefor embodying the present invention.

Figure 6 is a horizontal transverse section view of the coffee storage chamber taken along the lines 6—6 of Figure 5.

Figure 8 is a fragmentary vertical section view of the air relief safety valve taken along the lines 8—8 of Figure 5.

Figure 7:
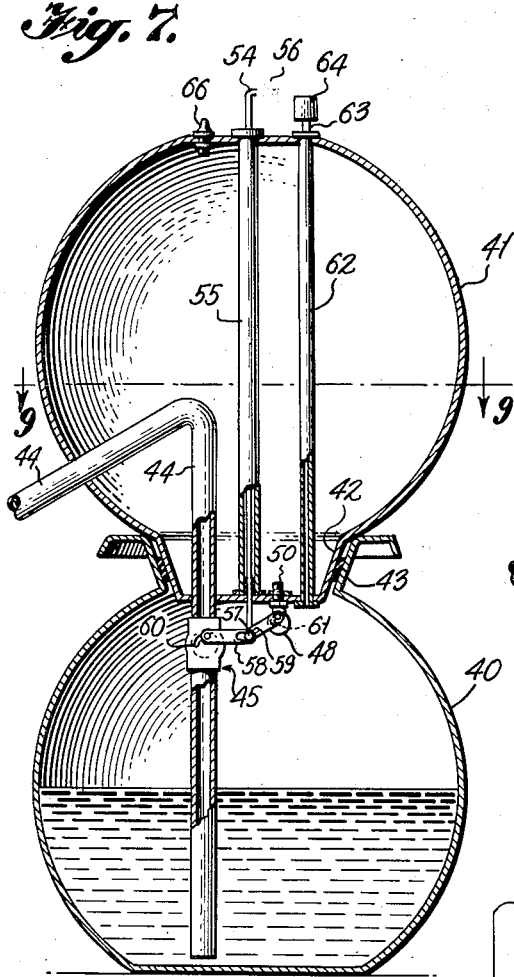
Figure 7 is a vertical transverse section through the coffee storage chamber and a coffee preserving accessory therefor, taken along the lines 7—7 of Figure 5.

Referring to the drawings wherein like reference characters designate corresponding parts throughout the several figures, and particularly to Figures 1 to 4 illustrating one preferred embodiment of the invention, the reference character 10 designates a coffee urn of the general type used in commercial establishments, having the appearance of an elongated cylindrical drum. The urn 10 is divided into an upper coffee brewing section 11 and a lower storage section 12, by means of a baffle plate 13 extending transversely of the urn approximately midway between the top and bottom thereof. The urn, in accordance with conventional practice, is provided with a suitable removable top 14 through which coffee containers and hot water used in brewing the coffee may be admitted to the brewing section 11. Also, suitable drain spigots 15 and 16 are provided immediately above the central baffle plate 13 and the bottom of the urn for withdrawing coffee and cleaning the urn.

Disposed within the storage section 12 is a transfer pipe 17 which extends from a point adjacent the midpoint of the baffle 13 to a point adjacent the bottom of the arm. An aperture 18 is formed in the baffle plate 13 immediately above the transfer pipe 17 and a coffee transfer valve 19 is interposed between the aperture 18 and the transfer pipe 17 by which flow of coffee from the brewing section 11 through the aperture 18 and into the transfer pipe 17 may be regulated. The valve 19, illustrated in detail in Figure 4, preferably comprises a valve housing 20 threaded at its lower end, as indicated at 21, to receive a complementary threaded portion of the transfer pipe 17. The valve housing 19 has a tapered bore 22 extending along a transverse axis of the housing and intercepting a vertical bore 23 communicating at its upper end with and complementary to the aperture 18 in the baffle plate 13. Within the transverse tapered bore 22 is mounted a conventional tapered cock or rotatable plug 24 having a bore 25 extending entirely through the height of the cock 24 along an axis perpendicular to the axis of the cock adapted to be aligned with the upper and lower portions of the bore 23 in the valve housing 20 and permit flow of liquid from the brewing section 11 to the storage section 12. As is conventional with such valves, passage of fluid through the bore 23 will be prevented when the tapered cup 24 is rotated so as to dispose its bore 25 out of alignment with the bore 23. Shoulder means of any suitable type, such as the nut 26 may be provided on the tapered cock adjacent the smaller diameter end thereof to bear against the exterior of the valve housing 20 and hold the cock within the tapered bore 22.

An aperture 26 is provided in the side wall of the coffee urn 10 adjacent the upper end of the storage section 12 at a point intercepting the axis of the tapered cock 24 and a pressure control valve 27 is mounted on the outside of the urn in covering relation with the aperture 26. The valve 27 is provided with a valve housing 28 having a tapered bore 29 diverging outwardly of the urn 10 and formed on an axis aligned with the axis of the tapered bore 22 of the valve housing 20. Within the tapered bore 29 is a tapered cock 30 having a peripheral recess 31 extending from the inner end of the cock 30 along the side thereof to a point midway between the inner and outer ends of the cock, to cooperate selectively with an aperture 32 extending through the wall of the valve housing 28 and communicating with a tubular conduit 33 and a conventional check valve 34 with a supply tank 35 of compressed carbon dioxide. Another aperture 36 is formed through the valve housing 28 and positioned to be in registry with the peripheral recess 31 of the valve cock 30 when the same is rotated through 90° from the position illustrated in Figure 3, providing a pressure relief path from the storage section 12 to outside air.

A connecting rod 37 interconnects the tapered cocks 24 and 30 of the coffee transfer valve 19 and the pressure control valve 27 to effect simultaneous rotation of the two tapered cocks, and a manual control knob 38 extends outwardly of the urn from the tapered cock 30 by which the position of the two tapered cocks may be adjusted. As will be apparent from an inspection of Figures 1, 3 and 4, the transverse bore 25 in the tapered cock 24 of the coffee transfer valve is so located relative to the peripheral recess 31 of the pressure control valve cock 30 that when the bore 25 is aligned with the bore 23 of the coffee transfer valve to permit flow of coffee into the storage section 12, the pressure control valve cock 30 is positioned to vent the storage section 12 to outside atmospheric pressure, and when the coffee transfer valve cock 24 is closed, preventing flow of coffee therethrough, the pressure control valve cock 30 communicates the storage section 12 through the conduit 33 and check valve 34 to the carbon dioxide supply 35.

Suitable pressure regulating means of any conventional type may be disposed between the pressure control valve 27 and the carbon dioxide supply 35 to maintain a selected light pressure in the storage section 12 which the storage section is in communication with the carbon dioxide supply. A safety valve 39 of the conventional construction is also provided in the side wall of the urn 10 adjacent the upper end of the storage section 12 to relieve excess pressure if such should build up in the storage section.

In operation of the above described embodiment, coffee is brewed in the upper brewing section 11 in the conventional manner. When the coffee has been brewed, during which time the coffee transfer valve 19 has been maintained in closed condition as illustrated in Figures 1 and 4, the manual control knob 38 is rotated through approximately 90° to bring the transverse bore 25 of the coffee transfer valve cock 24 into alignment with the transfer valve housing bore 23 to permit flow of coffee through the aperture 18 and transfer pipe 17 from the brewing section 11 into the storage section 12. At the same time, the pressure control valve cock 30 will have been so positioned that the aperture 26 is placed in communication with the relief aperture 36 communicating with outside atmospheric pressure, permitting air entrapped above the rising liquid level in the storage section 12 to escape through the relief aperture 36. When the brewed coffee has been drained through the valve 19 and transfer pipe 17 into the storage compartment 12, the manual control knob 38 is rotated to dispose the cocks 24 and 30 in the positions illustrated in Figures 3 and 4, shutting off the coffee transfer valve 19 and communicating the aperture 26 through the peripheral recess 31 and aperture 32 with the conduit 33 extending to the carbon dioxide tank 35. Carbon dioxide or other inert gas in the tank 35 will then flow through the check valve 34 and conduit 33 and valve 27 into the storage section 12 until a preselected pressure is established above the liquid level in the storage section. It will be observed that as coffee is withdrawn from the storage section 12 through the external tap 16, additional quantities of the inert gas such as carbon dioxide will flow into the storage section 12 in sufficient quantity to replace the volume of coffee withdrawn through the tap 16. Because the exposed surface of the brewed coffee in the storage section 12 is isolated from contact with air by virtue of the volume of inert gas, such as carbon dioxide, occupying the portions of the storage section 12 lying above the liquid level therein, oxidation and aging of the coffee arising from contact with air will be prevented, thereby insuring substantial preservation of freshly brewed coffee flavor.

Figure 9:
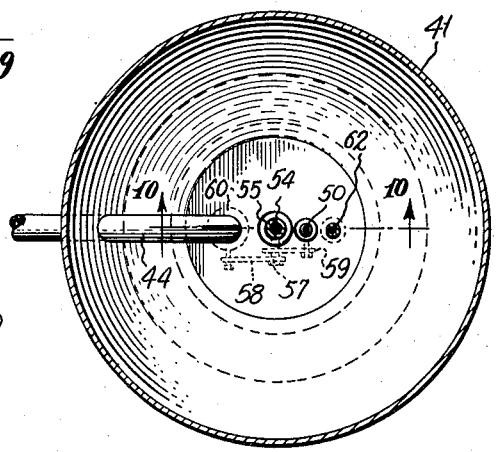
Figure 9 is a vertical transverse section view of the coffee preserving accessory taken along the lines 9—9 of Figure 7.
Figure 10:
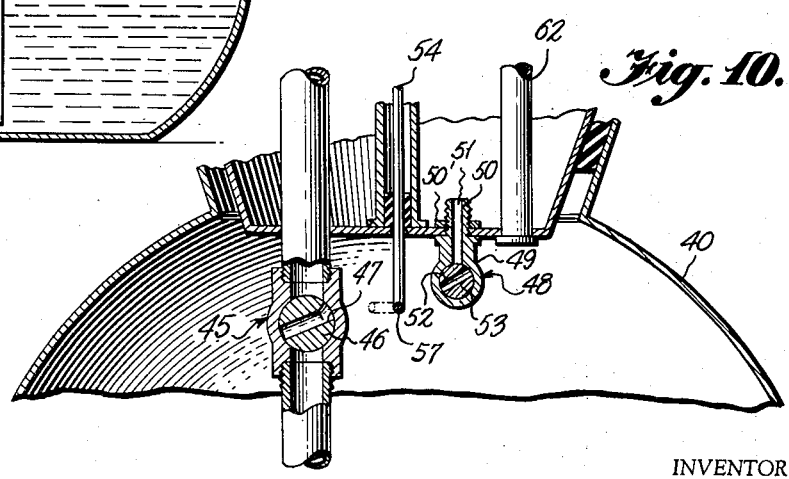
Figure 10 is an enlarged fragmentary vertical section view of the control valves and associated components of the coffee storing accessory.

A modified construction embodying the present invention and particularly adapted for family-type coffee brewing apparatus is illustrated in Figures 5 to 10, inclusive. This modification is designed to be used with dripolator-type coffee brewers having detachably connected upper and lower bowls. The modified apparatus is to be used only with the lower bowl, indicated by the reference character 40 of such apparatus. The coffee is to be brewed in the usual manner and the top bowl of the dripolator removed, or instant coffee is made in the lower bowl. The preserving accessory embodying the present invention, indicated by the reference character 41, is formed of a hollow metal sphere containing a quantity of inert gas, such as carbon dioxide, under pressure. The sphere is provided with a neck 42 in the lower portion thereof adapted to fit into the neck of the conventional lower bowl 40, a rubber gasket 43 being associated with the neck 42 to seal the storage bowl 40 and accessory 41. Supported in the accessory sphere 41 is an expel tube 44, preferably having a right angle bend therein located within the sphere 41, the portion below the bend extending through the lower end of the neck 42 a distance sufficient to dispose the lower end of the tube adjacent the bottom of the storage bowl 40 when the accessory is seated therein, and the other portion of the expel tube 44, extending through the side of the accessory sphere 41 forming a nozzle through which the coffee may be dispensed. Disposed in the expel tube 44 immediately below the neck 42 of the sphere 41 is a valve 45 of the conventional stopcock type having a cock 46 interrupting the bore of the expel tube 44 to control the flow of fluid therethrough, the cock 46 having a transverse bore 47 normally located out of alignment with the bore of the expel tube 44 in the position illustrated in solid lines in Figure 10.

A gas admission valve 48 is also mounted on the neck portion 42 of the sphere 41. The gas admission valve 48 has a valve housing 49 provided with a threaded projection 50 extending through and secured in the lower wall of the neck portion 42 of the sphere 41 by a complementary threaded collar 50'. A bore 51 extends through the housing 49 and is interrupted by a stopcock 52 rotatably supported in the valve housing 49 and having a transverse bore 53 to be selectively aligned with the bore 51 of the valve housing. It will be observed that the bore 53 of the stopcock of the valve 48 is somewhat smaller in diameter than the bore 47 in the stopcock of the fluid discharge valve 45. The stopcock 53 is also normally oriented in the matter illustrated in solid lines in Figure 10.

Means for simultaneously rotating the stopcocks of the valves 45 and 48 is provided, comprising a control rod 54 extending entirely through the sphere 41 and projecting from both ends thereof, the rod 54 being rotatably mounted in a housing tube 55. The upper end of the rod 54 is provided with an offset 56 to facilitate manual rotation of the rod, and the lower end of the rod is provided with an offset 57 extending through complementary slots in links 58 and 59. The link 58 is connected with the stopcock 46 of the valve 45 by means of a pin extending through a slot 60 in the housing of valve 45, and the link 59 is connected with the stopcock 52 by means of a pin extending through the slot 61 in the housing 49 of gas admission valve 48. The interconnection of the links 58 and 59 with their respective stopcocks 46 and 52 and with the offset 57 on the control rod 54 is such that when the offset 57 is in the position indicated in solid lines in Figure 10, the stopcocks are positioned also as illustrated in solid lines to prevent flow of gas or liquid through their respective valves. When the control rod 54 is rotated in a clockwise direction from the position illustrated in dotted lines in Figure 9, the transverse bores of the stopcocks 46 and 52 are rotated to the dotted line position shown in Figure 10, respectively admitting the inert gas under pressure in the sphere 41 to the storage bowl 40 and expelling brewed coffee from the bowl 40 through the expel tube 44.

A vent tube 62 extends through the sphere 41 for the height of this sphere and is provided with a tubular extension 63 at its upper end, as illustrated in Figure 8, associated at its outer end with a sliding vent cap 64 having vent apertures 65 in the sides thereof through which gas can escape from above the liquid level in the storage bowl 40.

A safety valve 66, similar to the safety valve 39 of the first embodiment, is provided in the upper portion of the sphere 41 to relieve excess gas pressure therein.

When coffee has been brewed and placed in the storage bowl 40 and the accessory sphere 41 has been seated thereon, the vent tube cap 64 is manually raised to permit escape of air trapped above the liquid level in the storage bowl 40 and the control rod 54 is rotated so as to open the gas admission valve 48. The inert gas such as carbon dioxide then flows from the sphere 41 into the storage bowl 40 displacing the air in contact with the liquid surface in the bowl 40, the displaced air escaping through the vent tube 62. During this initial charging operation, the exit end of the spout 44' of the expel tube 44 should be closed in any convenient manner to prevent discharge of coffee through the spout. After the control rod 44 is returned to normal position with the valves 45 and 48 closed, the inert gas trapped above the liquid level in the storage bowl 40 will prevent oxidation and aging of the coffee. It will be observed that whenever it is desired to discharge coffee from the bowl, this is accomplished by rotating the control rod 44 which opens the liquid discharge valve 45 permitting flow of coffee through the expel tube and also opens the gas admission valve 48 permitting additional quantities of inert gas to flow into the storage bowl 40 and displace the volume of coffee discharged. Also, because the bore 47 of the fluid discharge valve 45 is of larger diameter than the bore 53 of the gas admission valve 48, the valve 45 will be opened slightly in advance of opening of the valve 48 and will be closed slightly after closing of the valve 48, insuring accurate control of the discharge of coffee through the spout 44' and preservation of the desired pressure within the storage bowl 40.

While but two particular embodiments of the invention have been shown and described, it is apparent that various modifications may be made in the invention without departing from the spirit and scope thereof, and it is desired, therefore, that only such limitations shall be placed thereon as are imposed by the prior art and are set forth in the appended claims.

We claim:

1. Coffee brewing apparatus comprising a receptacle having an upper coffee brewing section and a lower coffee storage section separated from each other, transfer conduit means extending from said coffee brewing section into said storage section to a point adjacent the bottom thereof, discharge spigot means adjacent the bottom of said storage section for withdrawing coffee therefrom, a source of inert gas under pressure, gas-admission conduit means for coupling said inert gas to said storage section to displace air in contact with the surface of coffee stored in said storage section, valve means in said transfer conduit, valve means in said gas-admission conduit for controlling flow of gas through said conduit and for establishing an exhaust path to outside air, and means intercoupling both said valve means to vent said storage section to outside atmospheric pressure through the valve means in said gas-admission conduit when said transfer conduit valve means is open and to open said gas-admission conduit valve means to admit inert gas to said storage section when said transfer conduit valve means is closed.

2. Coffee brewing apparatus comprising a drum-shaped receptacle having an upper coffee brewing section and a lower coffee storage section, a baffle plate separating said sections, a transfer pipe extending from said baffle plate to a point adjacent the bottom of said storage section, discharge spigot means adjacent the bottom of said storage section for withdrawing coffee therefrom, a source of heavier-than-air inert gas under pressure, a gas-admission conduit for coupling said inert gas to said storage section to form an air-excluding blanket of said inert gas over the surface of brewed coffee in said storage section, a valve in said transfer pipe, said gas-admission conduit having an air exhaust aperture, valve means in said gas-admission conduit for admitting inert gas to said storage section in one position and for terminating flow of gas through said conduit and venting said storage section to said exhaust aperture in another position, and linkage means intercoupling both said valves to open said gas-admission conduit to flow of gas therethrough only when said transfer conduit valve is closed and to vent said storage section to outside atmospheric pressure through said exhaust aperture only when said transfer conduit valve is open.

References Cited in the file of this patent

UNITED STATES PATENTS

| | | |
|---|---|---|
| 609,590 | O. D. S. C. | Aug. 23, 1898 |
| 1,260,255 | Chevalley | Mar. 19, 1918 |
| 1,802,268 | Onofrio | Apr. 21, 1931 |
| 2,057,068 | Speer | Oct. 13, 1936 |
| 2,145,395 | Horvath | Jan. 31, 1939 |
| 2,264,837 | Gavin et al. | Dec. 2, 1941 |
| 2,462,019 | Bowman | Feb. 15, 1949 |
| 2,626,558 | Stein | Jan. 27, 1953 |

FOREIGN PATENTS

| | | |
|---|---|---|
| 154,793 | Switzerland | Aug. 1, 1932 |